US010820618B2

(12) United States Patent
Braun et al.

(10) Patent No.: US 10,820,618 B2
(45) Date of Patent: Nov. 3, 2020

(54) HEAT STERILIZED HIGH PROTEIN COMPOSITIONS WITH HYDROLYZED PROTEIN FROM A CONTINUOUS PROCESS WITH AT LEAST ONE ENDOPEPTIDASE

(71) Applicant: NESTEC S.A., Vevey (CH)

(72) Inventors: Marcel Braun, Konolfingen (CH); Nico Kreb, Hunibach (CH); Kristine Mette Sveje, Bridgewater, NJ (US)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 16/062,922

(22) PCT Filed: Nov. 22, 2016

(86) PCT No.: PCT/EP2016/078396
§ 371 (c)(1),
(2) Date: Jun. 15, 2018

(87) PCT Pub. No.: WO2017/102258
PCT Pub. Date: Jun. 22, 2017

(65) Prior Publication Data
US 2018/0368461 A1 Dec. 27, 2018

(30) Foreign Application Priority Data
Dec. 18, 2015 (EP) ..................................... 15201364

(51) Int. Cl.
| A61K 38/00 | (2006.01) |
| A23L 33/00 | (2016.01) |
| A23J 3/08 | (2006.01) |
| A23J 3/34 | (2006.01) |
| A23L 33/18 | (2016.01) |
| A23L 33/19 | (2016.01) |

(52) U.S. Cl.
CPC ................. *A23L 33/40* (2016.08); *A23J 3/08* (2013.01); *A23J 3/34* (2013.01); *A23L 33/18* (2016.08); *A23L 33/19* (2016.08)

(58) Field of Classification Search
None
See application file for complete search history.

(56) References Cited

U.S. PATENT DOCUMENTS

| 2008/0254505 | A1 | 10/2008 | Budolfsen et al. | |
| 2012/0142587 | A1* | 6/2012 | Minor | A23L 33/40 514/5.6 |
| 2015/0159189 | A1 | 6/2015 | Doring | |
| 2016/0150805 | A1* | 6/2016 | Braun | A23J 3/343 514/5.5 |

FOREIGN PATENT DOCUMENTS

| CN | 101641019 A | 2/2010 |
| EP | 2489281 B1 † | 8/2012 |
| JP | S6153792 A | 6/1994 |

(Continued)

OTHER PUBLICATIONS

Patent/Utility Model Examination Handbook, Part II, Chapter 2, 56 pages.

(Continued)

*Primary Examiner* — Satyanarayana R Gudibande
(74) *Attorney, Agent, or Firm* — K&L Gates LLP

(57) ABSTRACT

The present invention is directed to a heat sterilized composition comprising: a protein source in an amount of 5 to 20% by weight of the composition, said protein source comprising hydrolyzed protein; wherein the protein source has been treated in a continuous process with at least one endopeptidase, typically for a finite length of time. Furthermore, the invention concerns a heat sterilized high protein composition having low viscosity and being devoid of bitterness, comprising hydrolyzed heat sensitive protein source having a degree of protein hydrolysis in NPN/TN of 20 to 50% and at least one heat inactivated endopeptidase. The present invention is furthermore directed to a continuous process for preparing a heat sterilized composition which comprises a protein source containing hydrolyzed protein, the process comprising the following steps: (i) Providing an aqueous solution of a protein source; (ii) Performing a continuous hydrolysis step wherein the aqueous solution of a protein source is treated with at least one endopeptidase by heating at 40 to 90° C. and for a finite length of time of 2 to 20 minutes; (iii) heat inactivation of the endopeptidase. The invention also concerns a method of controlling viscosity and preventing bitter taste of a heat sterilized high protein composition, the method comprising providing an aqueous solution of a protein source and continuously hydrolyzing the aqueous solution of a protein source with at least one endopeptidase prior to heat inactivation of the said endopeptidase. Finally, the invention concerns the use of hydrolyzed protein prepared in a continuous process as described herein by treatment with at least one endopeptidase for a finite length of time, for preparing a heat sterilized composition and/or for controlling the viscosity of a liquid composition, wherein the composition comprises 5 to 20 weight % total protein. The invention also concerns medical uses and treatments applying or using the inventive heat sterilized composition.

6 Claims, 2 Drawing Sheets

Figure 1:
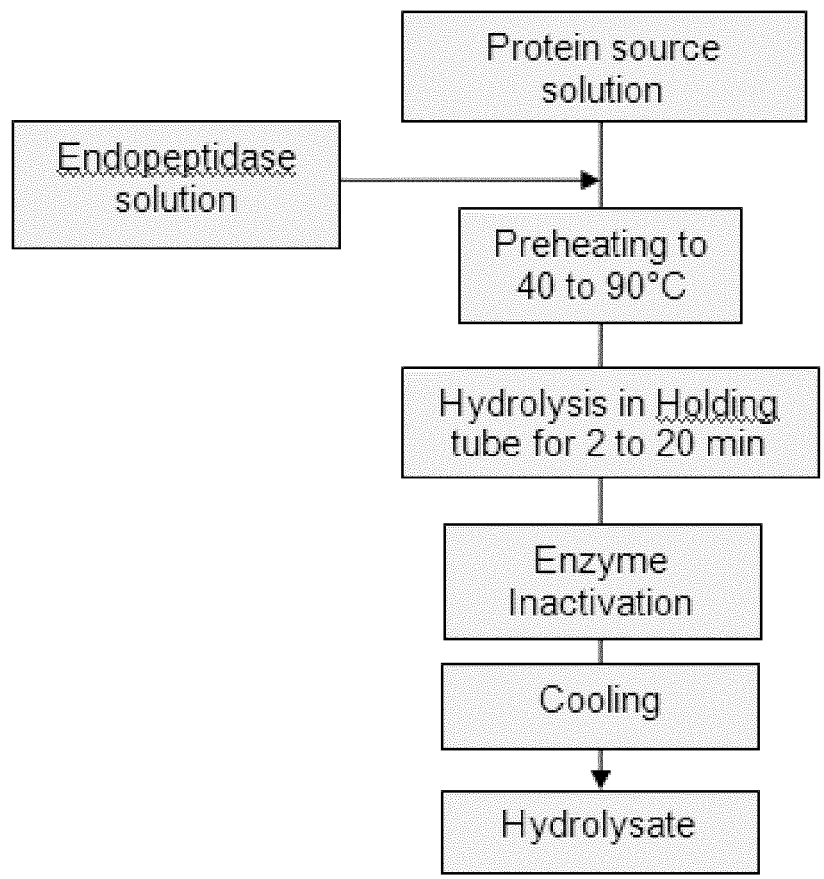

Specification includes a Sequence Listing.

(56) References Cited

FOREIGN PATENT DOCUMENTS

| | | | |
|---|---|---|---|
| WO | 0170047 | 9/2001 | |
| WO | WO-0170047 A1 * | 9/2001 | ............ A23C 21/02 |
| WO | 0215720 A2 | 2/2002 | |
| WO | 2008088472 | 7/2008 | |
| WO | 2009113845 | 9/2009 | |
| WO | WO-2009147105 A2 * | 12/2009 | ............ A23J 3/344 |
| WO | 2014055830 | 4/2014 | |
| WO | 2014207247 | 12/2014 | |

OTHER PUBLICATIONS

Japan Patent Office communication for application No. P2018-528971, dispatch No. 309237, dispatch date Aug. 4, 2020, 16 pages.

\* cited by examiner
† cited by third party

SEQUENCE LISTING

```
<160> NUMBER OF SEQ ID NOS: 1

<210> SEQ ID NO 1
<211> LENGTH: 225
<212> TYPE: PRT
<213> ORGANISM: Kutzneria albida

<400> SEQUENCE: 1

Ile Val Gly Gly Thr Lys Ala Ser Thr Ser Thr Tyr Pro Phe Val Val
1               5                   10                  15

Phe Leu Thr Asp Ser Thr Gly Phe Gln Phe Cys Gly Gly Thr Leu Val
                20                  25                  30

Lys Pro Asn Lys Val Val Thr Ala Ala His Cys Thr Val Gly Glu Ser
            35                  40                  45

Ala Ala Asn Ile Arg Val Val Ala Gly Arg Asp Lys Gln Ser Thr
        50                  55                  60

Ala Gly Thr Val Ser Lys Val Ser Lys Ile Trp Ile His Pro Ser Tyr
65                  70                  75                  80

Gln Asp Ala Thr Lys Gly Ser Asp Val Ser Val Leu Thr Leu Ser Thr
                85                  90                  95

Ser Leu Thr Gln Phe Thr Pro Leu Pro Leu Ala Ala Thr Thr Asp Thr
            100                 105                 110

Ala Leu Tyr Lys Glu Gly Thr Ala Ala Thr Ile Leu Gly Trp Gly Asp
        115                 120                 125

Thr Thr Glu Gly Gly Ser Ala Ser Arg Tyr Leu Leu Lys Ala Thr Val
    130                 135                 140

Pro Leu Thr Ser Asp Ala Thr Cys Lys Lys Ala Tyr Gly Glu Tyr Ser
145                 150                 155                 160

Ser Thr Ala Met Val Cys Ala Gly Tyr Pro Gln Gly Gly Thr Asp Thr
                165                 170                 175

Cys Gln Gly Asp Ser Gly Gly Pro Leu Val Ala Gly Asn Lys Leu Ile
            180                 185                 190

Gly Ile Thr Ser Trp Gly Gln Gly Cys Ala Glu Ala Gly Tyr Pro Gly
        195                 200                 205
```

```
Val Tyr Thr Arg Val Ala Thr Tyr Ser Ser Leu Ile Thr Gln Gln Leu
    210                 215                 220
Gly
225
```

HEAT STERILIZED HIGH PROTEIN COMPOSITIONS WITH HYDROLYZED PROTEIN FROM A CONTINUOUS PROCESS WITH AT LEAST ONE ENDOPEPTIDASE

CROSS REFERENCE TO RELATED APPLICATIONS

The present application is a National Stage of International Application No. PCT/EP2016/078396, filed on Nov. 22, 2016, which claims priority to European Patent Application No. 15201364.5, filed Dec. 18, 2015, the entire contents of which are being incorporated herein by reference.

FIELD OF THE INVENTION

The present invention is directed to a heat sterilized composition comprising: a protein source in an amount of 5 to 20% by weight of the composition, said protein source comprising hydrolyzed protein; wherein the protein source has been treated in a continuous process with at least one endopeptidase, typically for a finite length of time. Furthermore, the invention concerns a heat sterilized high protein composition having low viscosity and being devoid of bitterness, comprising hydrolyzed heat sensitive protein source having a degree of protein hydrolysis in NPN/TN of 20 to 50% and at least one heat inactivated endopeptidase. The present invention is furthermore directed to a continuous process for preparing a heat sterilized composition which comprises a protein source containing hydrolyzed protein, the process comprising the following steps: (i) Providing an aqueous solution of a protein source; (ii) Performing a continuous hydrolysis step wherein the aqueous solution of a protein source is treated with at least one endopeptidase by heating at 40 to 90° C. and for a finite length of time of 2 to 20 minutes; (iii) heat inactivation of the endopeptidase. The invention also concerns a method of controlling viscosity and preventing bitter taste of a heat sterilized high protein composition, the method comprising providing an aqueous solution of a protein source and continuously hydrolyzing the aqueous solution of a protein source with at least one endopeptidase prior to heat inactivation of the said endopeptidase. Finally, the invention concerns the use of hydrolyzed protein prepared in a continuous process as described herein by treatment with at least one endopeptidase for a finite length of time, for preparing a heat sterilized composition and/or for controlling the viscosity of a liquid composition, wherein the composition comprises 5 to 20 weight % total protein. The invention also concerns medical uses and treatments applying or using the inventive heat sterilized composition.

BACKGROUND

It is often advantageous to provide compositions containing a high protein content. This comes about since for instance an elderly person's ability to consume products may diminish. Alternatively, a sportsman or sportswoman whilst participating in sport may be in need of nutrition whilst the time taken to consume said nutrition should not impede their performance.

However, when increasing calories and/or the concentration of proteins in a nutritional liquid composition this increases the overall product viscosity and stability, and this has a disadvantageous effect on the palatability of the composition. In addition, minerals which may be incorporated or even bound to proteins can increase the mineral levels in a product with increased protein concentration to above acceptable nutritional limits. An increased viscosity can make the liquid nutritional composition difficult to consume or administer, and can also diminish the taste of the composition. Furthermore, the stability of such protein and energy dense liquid products may become a problem. This comes about since salt crystal formation during shelf life can become an issue, while it is desired that the nutritional product has a shelf life of at least 9 months, preferably at least 1 year.

One method to decrease the viscosity of a nutritional product containing protein is to hydrolyze the protein source therein, or employ a hydrolyzed protein source for the preparation thereof.

Conventional protein hydrolysis processes are based on batch processes such as:

Simple batch processes—including enzyme inactivation after hydrolysis time by product transfer to a heating unit. On an industrial scale batch processes often require a significant length of time, typically at least 1 to 3 hours. Furthermore, such processes allow little control regarding the degree of hydrolysis of the protein source and as a result provide products which are substantially bitter in taste. An example of such a batch process is for instance WO 2012/042013 A1.

Membrane batch reactors—wherein proteases, proteins and bigger peptides are kept in the retentate and smaller peptides can pass through the membrane with the permeate. Some advantages of using membrane batch reactors are that the same enzyme amount can be used for relatively large amounts of substrate as the enzyme does not pass through the membrane. Furthermore, the enzyme is not inactivated in the final hydrolysate.

US 2015/0159189 A1 describes a continuous process for the preparation of hydrolyzed proteins in a membrane reactor. Notably, protein hydrolysis is carried out in a membrane reactor in the presence of a protease enzyme at 10 to 45° C. Said process results in a high degree of protein hydrolysis, since any unreacted protein remains in the retentate along with the enzyme—and only hydrolyzed protein may pass through the membrane to the permeate. Furthermore, this process does not involve the step of inactivating the enzyme since this remains in the membrane—hence is recycled for further reaction with the protein source.

Using membrane reactors in a batch or continuous process suffers from several disadvantages including a different amino acid profile of the permeate compared to the substrate protein, fouling of the membrane, higher production costs along with processes employing membrane batch reactors being complex. Furthermore, membrane processes allow little control regarding the degree of hydrolysis of the protein source and as a result provide products, which are substantially bitter in taste.

In such processes, enzymes can be directly applied in free form or immobilized to a carrier. Immobilized enzymes have the advantage to be repeatedly used resulting in potential cost saving, especially for expensive enzymes. The drawbacks can be, microbial contamination, decreasing enzyme activity with increasing cycles, enzyme leaking and unspecific adsorption of proteins on carriers.

Accordingly, the existing protein hydrolysis processes typically provide products with a broad range of protein hydrolysis. In these processes many factors influence the process of hydrolysis, which makes these processes difficult to control and lead to a high risk that products are obtained have either high bitterness or are inadequate due to being too viscous. This is at least in part the result of an average of different degrees of protein hydrolysis obtained for instance during the initial hydrolysis step, during enzyme inactivation, transfer time or the residence time in the membrane reactor. A further factor to be considered is also the enzyme used to perform protein hydrolysis.

In view of the above, the problem underlying the present invention is therefore to provide compositions having a reliable and clearly determinable degree of hydrolysis of its protein content, and furthermore are less bitter in taste or preferably are devoid of bitterness. Furthermore, such compositions should have a low viscosity. Finally, the present invention is confronted with the problem of providing a process allowing preparing such compositions.

DESCRIPTION OF THE INVENTION

The present inventors have surprisingly found that by employing an endopeptidase in a continuous process, wherein the hydrolysis step with the endopeptidase is carried out for a preferably finite length of time followed by heat inactivation of the enzyme, gives a very narrow range of protein hydrolysis—even for products already containing partially hydrolyzed proteins.

According to the present invention the underlying problem is therefore preferably solved by heat sterilized compositions as described in the independent claims and furthermore a process for preparing such heat sterilized compositions and uses according to independent claims as described herein. The dependent claims advantageously illustrate further preferred aspects of the inventive embodiments.

More preferably, the problem underlying the present invention is solved according to a first embodiment by a heat sterilized composition comprising:
a protein source in an amount of at least 5% by weight of the composition, said protein source comprising hydrolyzed protein;
wherein the protein source has been treated in a continuous process with at least one endopeptidase by heating, preferably at 40 to 90° C., typically for a finite length of time, preferably selected from a period of 2 to 20 minutes.

According to a second embodiment the object underlying the present invention is preferably solved by a heat sterilized, preferably high protein composition, preferably having low viscosity and preferably being devoid of bitterness, comprising hydrolyzed heat sensitive protein source having a degree of protein hydrolysis in NPN/TN of 20 to 50% and at least one inactivated endopeptidase, preferably wherein the endopeptidase has been inactivated by heat.

According to a preferred aspect the heat sterilized composition is a liquid composition. Such a liquid composition preferably has a low viscosity, preferably a viscosity of below 875 mPa s at 20° C./100 s$^{-1}$ or below 600 mPa s at 20° C./100 s$^{-1}$, most preferably of from 210 to 300 mPa s at 20° C./100 s$^{-1}$ or 250 to 400 mPa s at 20° C./100 s$^{-1}$ or 350 to 500 mPa s at 20° C./100 s$^{-1}$. Most preferably for said viscosity of below 875 mPa s at 20° C./100 s$^{-1}$ or below 600 mPa s at 20° C./100 s$^{-1}$ the protein source is in an amount of from 15 to 20% by weight of the composition, preferably 16 to 18% by weight of the composition.

In a specific aspect such a liquid composition preferably has a low viscosity, preferably a viscosity of below 400 or even below 200 mPa s at 20° C./100 s$^{-1}$, typically with a lower range of at least 10 mPa s at 20° C./100 s$^{-1}$, preferably of from 10 to 195 mPa s at 20° C./100 s$^{-1}$.

Likewise such a liquid composition preferably has a low viscosity, preferably a viscosity of below 350 mPa s at 70° C./100 s$^{-1}$ or 240 mPa s at 70° C./100 s$^{-1}$, most preferably of from 82 to 120 mPa s at 70° C./100 s$^{-1}$ or 98 to 156 mPa s at 70° C./100 s$^{-1}$ or 137 to 195 mPa s at 70° C./100 s$^{-1}$. Most preferably for said viscosity of below 350 mPa s at 70° C./100 s$^{-1}$ or below 240 mPa s at 70° C./100 s$^{-1}$ the protein source is in an amount of from 5 to 12% by weight of the composition, preferably in an amount of 8 to 10% weight of the composition.

In an further aspect such a liquid composition preferably has a low viscosity, preferably a viscosity of below 80 mPa s at 70° C./100 s$^{-1}$, preferably of from 4 to 78 mPa s at 70° C./100 s$^{-1}$.

The viscosity may be determined by methods known to a skilled person, e.g. by using a rotational viscosity meter using a cone/plate geometry, preferably by a Haake Reometer Haake RheoStress 100 5 n·cm, Thermo Scientific Germany—measurement setup: 0-600 s$^{-1}$ (cr. Lin.); 300 seconds; 20° C. or 70° C.+/-0.1°; Data #300 Temperature controller Peltier TC80, measuring geometry: plate-plate 60 mm diameter 2 mm gap.

According to one further preferred aspect the heat sterilized composition may have a caloric density of at least 1.5 kcal/mL of the composition, preferably at least 1.8 kcal/mL, preferably at least 2.0 kcal/mL, preferably at least 2.2 kcal/mL of the composition, preferably wherein the caloric density is from 1.5 kcal/mL to 6 kcal/mL or 1.5 kcal/mL to 3.5 kcal/mL or 1.9 kcal/mL to 2.4 kcal/mL or 2.3 kcal/mL to 2.8 kcal/mL or from 2.6 kcal/mL to 3.2 kcal/mL.

According to a preferred aspect the inventive heat sterilized composition is an enteral composition or parenteral composition, most preferably an enteral composition.

Protein Source

According to one aspect of the inventive heat sterilized composition, the protein source as contained therein is or comprises a heat sensitive protein from animal or plant origin.

The heat sensitive protein as contained in the inventive heat sterilized composition may be selected from whey protein, e.g. whey protein isolate, acidified whey protein isolate, whey protein concentrate, whey powder, or further whey protein sources, or may be selected from egg protein or casein, or from plant proteins such as pea protein, potato protein, soy protein, soy protein isolate, sunflower protein and their fractions or may be selected from combinations of any such protein sources and the like either alone or in combination.

Even more preferably the protein source as contained in the inventive heat sterilized composition is whey protein, pea protein, potato protein, wheat protein, sunflower protein, soy protein, or mixtures thereof. In the most preferred aspect the protein source is whey protein.

Preferably the protein source is native.

Generally, the inventive heat sterilized composition may also contain casein as a protein source. Nevertheless, according to one specific aspect the inventive heat sterilized composition does not contain casein. In case, however, casein is present casein is preferably present in combination with whey protein, preferably with a whey protein/casein weight ratio of 30/70 to 70/30, preferably 40/60 to 60/40, preferably 45/55 to 55/45. In a particularly preferred aspect, casein is present in a whey protein/casein weight ratio of 50/50.

In some aspects the protein source of the inventive heat sterilized composition may be obtained from the corresponding raw materials by processing and extraction techniques familiar to a person skilled in the art. The thus obtained protein source may then be hydrolysed in a continuous process as described herein.

In this light, when the protein source of the inventive heat sterilized composition comprises or contains a plant protein the plant protein may be obtained by e.g. an extraction process or a solvent extraction of corresponding protein containing plant parts, such as the dehulled and cracked soybeans, as it is known to a skilled person. In case of soy protein, for example, a soy protein isolate as the protein source may be obtained for instance by a process comprising:

1. optionally defattening of plant components by solvent extraction.
2. resolubilisation in water or mild alkali, separation of insolubles (fibres) and heat treatment of the extract for e.g. trypsin inhibitor inactivation.
3. separation of the oligosaccharides and phytic acid by acid precipitation and washing of the proteins.
4. optionally neutralisation and solubilisation of the precipitated soy proteins.

The thus obtained protein source can then be hydrolysed in a continuous process as described herein.

In some aspects the protein source of the inventive heat sterilized composition may furthermore comprise at least one component selected from;
(a) a sugar component in an amount of 0.5 to 7.5% by weight of the composition, wherein said sugar is selected from the group consisting of sucrose, maltodextrin, lactose or glucose; and/or
(b) a phosphate component in an amount of 0.03% to 0.5% by weight of the composition, preferably 0.06% to 0.125% by weight of the composition, and/or a citrate component in an amount of 0.07% to 1.05% by weight of the composition, preferably 0.13% to 0.26% by weight of the composition.

According to the first and second defined embodiments the inventive heat sterilized composition contains a protein source in an amount of at least 5% by weight of the composition. More preferably, the protein source may be contained in an amount of at least 10% by weight of the composition, at least 12% by weight, at least 14% by weight or at least 16% by weight of the composition. According to a particularly preferred aspect the inventive composition is a heat sterilized high protein composition wherein the protein source is present in an amount of 5 to 20% by weight, preferably 11 to 20% by weight or 13 to 20% or 15 to 20% by weight of the composition, alternatively in an amount of from 5 to 15% by weight or 6 to 8% by weight or 10 to 15% by weight, or 15 to 20% by weight of the composition, most preferably 8 to 15% by weight of the composition.

According to a further preferred aspect the protein source may be present in the inventive heat sterilized composition in a protein concentration of up to 17 g/mL of the composition, preferably from 11 g/mL to 17 g/mL of the composition, preferably from 12 g/mL to 16 g/mL, preferably 13 g/mL to 15 g/mL of the composition.

As defined before, the protein source of the inventive heat sterilized composition has been treated in a continuous process with at least one endopeptidase by heating, preferably at 40 to 90° C., more preferably at 60 to 80° C., even more preferably 70 to 85° C.

Furthermore, such heat treatment is carried out for a finite length of time. Such a finite length of time is preferably 2 to 20 minutes, e.g. 2 to 10 minutes, 5 to 15 minutes or 10 to 20 minutes, 2 to 5 minutes, 5 to 10 minutes, 10 to 15 minutes or 15 to 20 minutes, to obtain hydrolyzed protein.

According to one further preferred aspect of the inventive composition the protein source to be hydrolysed has a pH of 6 to 11, e.g. a pH of 6.0 to 8.0, or a pH of 7.0 to 9.0, or a pH 8.0 to 10.0, or a pH 9.0 to 11.0, preferably a pH from pH of 6.0 to 8.0.

Degree of Protein Hydrolysis

According to one further preferred aspect, the inventive heat sterilized composition has a degree of protein hydrolysis in NPN/TN of 20 to 50%, preferably 22 to 30% or 23 to 26% or 25 to 32% or 28 to 35% or 32 to 38% or 34 to 40% or 36 to 42% or 38 to 44%. Preferably this is the degree of protein hydrolysis contained in the final product as obtained by the inventive process.

The degree of protein hydrolysis as determined herein by NPN/TN refers to the ratio between non-protein nitrogen (NPN) and total nitrogen (TN). In this context total nitrogen (TN) and non-protein nitrogen (NPN) are preferably determined as 12% trichloric acid soluble fractions and typically analysed using the Kjeldahl method. Protein concentrations are then based on total nitrogen multiplied with factor 6.25 (TN: LI-00.556-2/AS-INC-114.01; NPN: LI-00.561-2/AS-INC-047.01). In this context it is referred to "Rowland S. J.: The determination of the nitrogen distribution in milk, J. Dairy Res. 9 (1938) 42-46", the content of which is incorporated herein by reference.

In a particular aspect of the inventive heat sterilized composition the degree of protein hydrolysis may be determined as the ratio of α-amino N/TN. Such a ratio, for the purposes of the present invention, may be e.g. 4.5 to 6.5%, preferably 4.8 to 5.1% or 5.0 to 5.4% or 5.2 to 5.8% or 5.5 to 6.0% or 5.8 to 6.3% α-amino N/TN.

In another aspect the degree of protein hydrolysis may be determined as the ratio of α-amino N/TN. Such a ratio, for the purposes of the present invention, may be e.g. 3 to 10%, preferably 5 to 7% or 6 to 8% or 7 to 9% α-amino N/TN.

Preferably this is the degree of protein hydrolysis contained in the final product as obtained by the inventive process.

The degree of the α-amino Nitrogen [α-amino N/TN (%)] as defined herein may be determined using the TNBS method as described in "LI-08.088-2. Adler-Nissen, J. (1979). Determination of the degree of hydrolysis of food protein hydrolysates by trinitrobenzene-sulfonic acid: J. Agric. Food Chem., 27: 1256-1262", the content of which is incorporated herein by reference.

Endopeptidase

According to the first and second embodiments the protein source of the inventive heat sterilized composition has preferably been treated in a continuous process with at least one endopeptidase. An endopeptidase as defined in the context of the inventive heat sterilized composition is typically a proteolytic peptidase, which breaks down peptide bonds of non-terminal amino acids.

According to one preferred aspect the at least one endopeptidase may be an endopeptidase containing enzyme preparation, more preferably may comprise or consist of at least one endopeptidase. Such an endopeptidase may be selected from a serine protease, more preferably wherein the serine protease is selected from at least one of trypsin, trypsin-like endopeptidases, subtilisin or combinations thereof.

In one aspect, the at least one trypsin-like endopeptidase is derived from a strain of *Fusarium*, preferably *Fusarium oxysporum* and has at least 75%, at least 80%, at least 85%, at least 90%, at least 95%, at least 96%, at least 97%, at least 98%, at least 99% or 100% sequence identity to the sequence denoted by SWISSPROT No. P35049.

In a further aspect the at least one trypsin-like endopeptidase is derived from a strain of *Kutzneria*, preferably *Kutzneria albida* and has at least 75%, at least 80%, at least 85%, at least 90%, at least 95%, at least 96%, at least 97%, at least 98%, at least 99% or 100% sequence identity to the mature polypeptide SEQ ID NO: 1.

All sequences are listed in ASCII file Sequence Listing PatentIn-HEAT STERILIZED HIGH PROTEIN COMPOSITIONS WITH HYDROLYZED PROTEIN FROM A CONTINUOUS PROCESS WITH AT LEAST ONE ENDOPEPTIDASE-03151, Size 2,271 bytes, and Date of Creation Jul. 24, 2018, incorporated herein by reference.

The serine proteases generally may also comprise chymotrypsin and/or chymotrypsin-like endo-peptidases, or elastase, elastase-like proteases, either alone or in combination with the above-mentioned peptidases. However, according to one preferred aspect the at least one endopeptidase as used for hydrolysis of the protein source as defined herein does not comprise a chymotrypsin and/or a chymotrypsin-like endopeptidase.

Most preferably the at least one endopeptidase is a subtilisin containing protease preparation, preferably alcalase 2.4 L.

Furthermore, according to one preferred aspect, the at least one endopeptidase may be selected from of thermolysin, aspartic protease, pepsin, glutamyl endopeptidase, acidic endopeptidases, aspartic protease and similar microbial endopeptidases or combinations thereof.

Furthermore, according to one preferred aspect, the at least one endopeptidase may be selected from a plant based protease, preferably papain, bromelain or combinations thereof.

According to a particularly preferred aspect the endopeptidase used to hydrolyse the protein source of the inventive heat sterilized composition may be employed in 0.5 to 5% by weight based on the protein source, preferably in 1 to 3% by weight or 2 to 4% by weight.

In some aspects, the concentration of the endopeptidase used to hydrolyse the protein source of the inventive heat sterilized composition may be 0.05 to 5 mg per gram of the protein source, preferably 0.1 to 0.5 mg or 0.3 to 1 mg or 0.8 to 1.5 mg or 1.2 to 2 mg or 1.6 to 2.5 mg or 2.2 to 3 mg or 2.7 to 3.5 mg or 3.1 to 4 mg or 3.8 to 4.5 mg per gram of the protein source.

Other Components

Following a further aspect the inventive heat sterilized composition also comprises micronutrients selected from vitamins, minerals and trace elements, which may be present either alone or in combination. Alternatively, in some aspects the inventive heat sterilized compositions may also not contain any micronutrients.

The term "micronutrient" as used herein refers to vitamins and (dietary) minerals that are required in the human diet in very small amounts.

The term "vitamin" as used herein, refers to any of various organic substances essential in minute quantities to the nutrition of most animals act especially as coenzymes and precursors of coenzymes in the regulation of metabolic processes. Vitamins have diverse biochemical functions, including function as hormones (for example, vitamin D), antioxidants (for example, vitamin C and vitamin E), and mediators of cell signalling, regulation of cell growth, tissue growth and differentiation (for example, vitamin A). The B complex vitamins, which is the largest in number, function as precursors for enzyme cofactor biomolecules (co-enzymes) that help act as catalysts and substrates in metabolism. For instance Vitamin $B_6$ and Vitamin $B_{12}$. Other Vitamins, which may be present, include Vitamin K, Thiamin, Riboflavin, Niacin, Folic Acid, Biotin and Pantothenic Acid.

According to a particularly preferred aspect, the inventive heat sterilized composition comprises a mineral content of 1.5 to 5% by weight based on the protein source, preferably 1.5 to 2% by weight or 1.8 to 2.5% or 2.3 to 3% or 2.8 to 3.5% or 3.3 to 4% or 3.8 to 4.5% by weight based on the protein source, most preferably 1.6 to 2.2% by weight based on the protein source.

Minerals in this context are preferably dietary minerals such as e.g. calcium, magnesium, phosphorus, potassium, sodium, and sulphur. Preferably, calcium is contained in the inventive heat sterilized composition as a mineral and optionally at least one further dietary mineral as described before.

Further minerals that may be needed and employed in the inventive heat sterilized composition may be trace elements. Such trace elements are typically minerals that are needed in relatively small quantities, for example, chromium, cobalt, copper, chloride, fluorine, iodine, manganese, molybdenum, selenium, and zinc.

Accordingly, in some aspects, the inventive heat sterilized composition can include any combination of vitamins, minerals and trace elements that is useful in providing appropriate nutrition to the patient. The vitamins, minerals and trace elements may be used in the form of a mixture or formulation. The amounts of specific vitamins and minerals in the inventive heat sterilized composition may be determined by one of skill in the art.

According to a further aspect, the inventive heat sterilized composition also may be provided as a food matrix. A food matrix is defined herein as being any type of food in liquid or powder form, e.g. a beverage, a food supplement, etc. wherein said food matrix contains the inventive heat sterilized composition as defined herein and optionally further proteins and/or fat and/or carbohydrate. Preferably, the inventive heat sterilized composition is liquid, more preferably provided as a beverage.

According to a particularly preferred aspect, the inventive heat sterilized composition is a nutritional composition, a nutritional supplement, an infant formula, a follow-up formula, a baby food formula, an infant cereal formula or a growing-up milk, an infant or child's food supplement, a children formula, an adult nutritional composition, maternal nutritional supplement, bariatric formula, elderly nutritional composition or health care formula; most preferably the aforesaid compositions are enteral compositions or parenteral compositions.

Furthermore, in some aspects the heat sterilized composition of the present invention may be in form of a supplement or may be used as a sole source of nutrition, e.g. be provided as a full meal. The term "supplement" as used herein refers to a nutrient that may be added to the diet or a meal thereof.

In the above context, an infant is defined herein as being up to 1 year of age, whereas children are defined as being at least from 1 to 7 years of age.

Furthermore, in this context, follow-up formulae are preferably designed to complement the changing diet of the older infant and provide a more balanced and complete food, better adapted to the child's nutritional needs at this age than normal milk. Growing-up milks (GUMs) can be considered a subgroup of follow-up formulas and are also included into the above-captioned definition. Such GUMs are adapted more particularly to the nutritional needs of children of one year or older, for example 1-6 years. Generally, GUMs are adapted specifically to the nutritional needs of children of a specific age. For example, there are GUMs for children of 1-3 years, 3-5 years and above 5 years old.

Finally, maternal nutrition is typically defined as being for pregnant and lactating women, and furthermore encompasses pre-conception administration to a woman willing to have a baby.

According to one preferred aspect the food matrix optionally may contain carbohydrate, probiotic, prebiotics, minerals, thickeners, buffers or agents for pH adjustment, chelating agents, colorants, emulsifiers, excipients, flavour agents, osmotic agents, preservatives, stabilizers, sugar, sweeteners, texturizers, and/or vitamins. For example, the nutritional compositions may contain emulsifiers and stabilizers such as soy lecithin, citric acid esters of mono- and di-glycerides, and the like. The optional ingredients can be added in any suitable amount.

According to a specific embodiment, the inventive heat sterilized composition may be used to prepare a food matrix as defined above, preferably a beverage, a food supplement, more preferably a nutritional composition, a nutritional supplement, an infant formula, a follow-up formula, a baby food formula, an infant cereal formula or a growing-up milk, an infant or child's food supplement, a children formula, an adult nutritional composition, maternal nutritional supplement, bariatric formula, elderly nutritional composition or health care formula.

In a further embodiment the inventive heat sterilized composition can also be used as a pharmaceutical and/or a nutraceutical product.

According to a further embodiment, uses of the inventive heat sterilized compositions as described herein, either as described initially or as obtained or obtainable according to the inventive process as described below, are contemplated. In one embodiment the inventive heat sterilized composition may be used for providing nutrition to a person in need thereof, wherein the person is preferably an elderly person, an infant or a child, a person that is in a disease state, a person that is recovering from a disease state, a person that is malnourished, or a healthy person such as a sportsman or sportswoman or an active elderly.

Within the context of the present invention, the nutritional ingredients of the heat sterilized composition, typically include proteins, fats and carbohydrates, which are selected depending on the product type.

According to a yet further embodiment the use of hydrolyzed protein is contemplated as described herein, which has been preferably prepared in a continuous process with at least one endopeptidase by heating, preferably at 40 to 90° C., typically for a finite length of time, e.g. selected from a period of 2 to 20 minutes, for preparing a heat sterilized heat sterilized composition as defined herein comprising 5 to 20 weight % total protein, preferably a liquid composition, wherein preferably the liquid composition is an enteral composition or parenteral composition. More preferably a heat sterilized composition as defined herein.

According to one embodiment a method of controlling the viscosity and preventing bitter taste of a heat sterilized high protein composition is provided as described herein, the method comprising providing an aqueous solution of a protein source and continuously hydrolyzing the aqueous solution of a protein source with at least one endopeptidase prior to inactivation of the said endopeptidase, preferably wherein the inactivation is heat inactivation. Preferably, the components and conditions are as outline above for the inventive heat sterilized composition are also applied herein.

In another embodiment of the present invention embodiment the use of hydrolyzed protein is contemplated as described above, which has been preferably prepared in a continuous process with at least one endopeptidase by heating, preferably at 40 to 90° C., typically for a finite length of time, e.g. selected from a period of 2 to 20 minutes, for controlling the viscosity of a liquid heat sterilized composition as defined herein comprising 5 to 20 weight % total protein, wherein preferably the liquid composition is an enteral composition or parenteral composition. More preferably the heat sterilized composition is as defined herein. Preferably, the components and conditions are as outline above for the inventive heat sterilized composition are also applied herein.

Preferably, the heat sterilized composition of the present invention as defined herein could be obtained by any process suitable for a skilled person. More preferably, the heat sterilized composition of the present invention could be obtained by a process as defined in further detailed below.

According to a further embodiment, the object underlying the present invention is therefore preferably also solved by a process for preparing an heat sterilized composition, preferably a heat sterilized composition as defined herein, preferably a heat sterilized enteral composition or heat sterilized parenteral composition, most preferably a heat sterilized enteral composition.

The present invention hence also describes a heat sterilized composition as described above, preferably a heat sterilized composition obtained or obtainable according to a process for preparing such a composition as defined herein. In this regard, said process may contain or comprise any of the amounts and ingredients as defined for the inventive heat sterilized composition.

Process

Hence, according to a particularly preferred embodiment the problem underlying the present invention is solved by a continuous process for the preparation of a heat sterilized composition, more preferably a heat sterilized composition as described herein, which comprises a protein source containing hydrolyzed protein.

The continuous process according to the invention typically includes the following steps:
(i) Providing an aqueous solution of a protein source;
(ii) Performing a continuous hydrolysis step wherein the aqueous solution of a protein source is treated with at least one endopeptidase by heating, preferably at 40 to 90° C., typically for a finite length of time, e.g. selected from a period of 2 to 20 minutes;
(iii) heat inactivation of the endopeptidase.

Step (i) of the Inventive Process
Protein Source

According to step (i) of the inventive process, an aqueous solution of a protein source is provided. Such a protein source is or comprises preferably a heat sensitive protein as defined herein.

Such a heat sensitive protein as provided in step (i) of the inventive process may be selected from whey protein, e.g. whey protein isolate, acidified whey protein isolate, whey protein concentrate, whey powder, or further whey protein sources, or may be selected from egg protein or casein, or from plant proteins such as pea protein, potato protein, soy protein, soy protein isolate, sunflower protein and their fractions or may be selected from combinations of any such protein sources and the like either alone or in combination.

Even more preferably the protein source as provided in the inventive process is whey protein, pea protein, potato protein, wheat protein, sunflower protein, soy protein, or mixtures thereof. In the most preferred aspect the protein source is whey protein.

Preferably the protein source is native.

Generally, the inventive process may also provide casein as a protein source. Nevertheless, according to one specific aspect the inventive process does not apply casein. In case, however, casein is used casein is preferably present in combination with whey protein, preferably with a whey protein/casein weight ratio of 30/70 to 70/30, preferably 40/60 to 60/40, preferably 45/55 to 55/45. In a particularly preferred aspect, casein is used in a whey protein/casein weight ratio of 50/50.

In some aspects the protein source provided in step (i) of the inventive process may be obtained from the corresponding raw materials by processing and extraction techniques familiar to a person skilled in the art, e.g. as described above. The thus obtained protein source may then be hydrolysed in a continuous process as described herein.

In some aspects the protein source provided in step (i) of the inventive process may furthermore comprise at least one component selected from;
(a) a sugar component in an amount of 0.5 to 7.5% by weight of the protein source or preferably by weight of the final heat sterilized composition, wherein said sugar is selected from the group consisting of sucrose, maltodextrin, lactose or glucose; and/or
(b) a phosphate component in an amount of 0.03% to 0.5% by weight of the protein source or preferably by weight of the final heat sterilized composition, preferably 0.06% to 0.125% by weight of the protein source or the final heat sterilized composition, and/or a citrate component in an amount of 0.07% to 1.05% by weight of the protein source or by weight of the final heat sterilized composition, preferably 0.13% to 0.26% by weight of the of the protein source or by weight of the heat sterilized composition.

According to the above-defined inventive process a protein source is provided in an amount of at least 5% by weight of the composition. More preferably, the protein source may be provided in an amount of at least 10% by weight of the composition, at least 12% by weight, at least 14% by weight or at least 16% by weight of the composition. According to a particularly preferred aspect the protein source is provided in an amount of 5 to 20% by weight of the heat sterilized high protein composition, preferably 11 to 20% by weight or 13 to 20 or 15 to 20% by weight of the composition, alternatively in an amount of from 5 to 15% by weight or 6 to 8% by weight or 10 to 15% by weight, or 15 to 20% by weight of the composition, most preferably 8 to 15% by weight of the composition.

According to a further preferred aspect the protein source may be provided in the inventive process in step (i) in a protein concentration of up to 17 g/mL of the composition, preferably from 11 g/mL to 17 g/mL of the composition, preferably from 12 g/mL to 16 g/mL, preferably 13 g/mL to 15 g/mL of the composition.

According to one preferred aspect of the inventive process, prior to step (ii) a protein hydration step may be carried out, most preferably after a pH adjustment of the protein source, wherein said hydration step is preferably for 10 minutes to 2 hours, e.g. most preferably 20 to 30 minutes or from 25 to 40 minutes or from 35 minutes to 1 hour or from 45 minutes to 1 hour 20 minutes or from 1 hour 10 minutes to 1 hour 30 minutes, most preferably for 55 minutes to 1 hour 5 minutes. Said hydration step is preferably carried out at 40 to 90° C., more preferably at 60 to 80° C., even more preferably 70 to 85° C., e.g. at 40 to 90° C., preferably 45 to 50° C. or 48 to 55° C. or 52 to 60° C. or 58 to 65° C. or 62 to 70° C. or 68 to 70° C. or 71 to 75° C. or 72 to 78° C. or 77 to 83° C. or 81 to 86° C.

Step (ii) of the Inventive Process

According to step (ii) of the inventive process a hydrolysis step is carried out, wherein the aqueous solution of a protein source is treated with at least one endopeptidase by heating, preferably at 40 to 90° C., typically for a finite length of time, e.g. selected from a period of 2 to 20 minutes.

Degree of Protein Hydrolysis

The hydrolysis of step (ii) and preferably of all steps (i), (ii), and (iii) of the inventive process preferably leads to a degree of protein hydrolysis in NPN/TN of 20 to 50%, preferably 22 to 30% or 23 to 26% or 25 to 32% or 28 to 35% or 32 to 38% or 34 to 40% or 36 to 42% or 38 to 44% in the final product of the process.

According to one alternative aspect the inventive process as described herein following steps (i) to (iii) provides a protein source with a (final) degree of protein hydrolysis in α-amino N/TN is 4.5 to 6.5%, preferably 4.8 to 5.1% or 5.0 to 5.4% or 5.2 to 5.8% or 5.5 to 6.0% or 5.8 to 6.3% α-amino N/TN in the final product of the process.

According to one further alternative aspect the inventive process as described herein following steps (i) to (iii) provides a protein source with a (final) degree of protein hydrolysis in α-amino N/TN is 3 to 10%, preferably 5 to 7% or 6 to 8% or 7 to 9% α-amino N/TN in the final product of the process.

In a preferred embodiment, the degree of protein hydrolysis provided by the inventive process may be determined by the methods as already described for the inventive composition.

Endopeptidase

According to one preferred aspect the at least one endopeptidase as employed in step (ii) of the inventive process comprises or consists of an endopeptidase containing enzyme preparation, more preferably may comprise or consist of at least one endopeptidase.

According to a particularly preferred aspect the at least one endopeptidase as employed in step (ii) of the inventive process may be selected from a serine protease, preferably wherein the serine protease is selected from at least one of trypsin, trypsin-like, subtilisin, chymotrypsin, chymotrypsin-like, or elastase, elastase-like proteases, or combinations thereof, preferably a trypsin-like endopeptidase.

In one aspect, the at least one trypsin-like endopeptidase is derived from a strain of *Fusarium*, preferably *Fusarium oxysporum* and has at least 75%, at least 80%, at least 85%, at least 90%, at least 95%, at least 96%, at least 97%, at least 98%, at least 99% or 100% sequence identity to the sequence denoted by SWISSPROT No. P35049.

In a further aspect the at least one trypsin-like endopeptidase is derived from a strain of *Kutzneria*, preferably *Kutzneria albida* and has at least 75%, at least 80%, at least 85%, at least 90%, at least 95%, at least 96%, at least 97%, at least 98%, at least 99% or 100% sequence identity to the mature polypeptide SEQ ID NO: 1.

The serine proteases generally may also comprise chymotrypsin and/or chymotrypsin-like endo-peptidases, either alone or in combination with the above-mentioned peptidases. However, according to one preferred aspect the at least one endopeptidase as used for hydrolysis of the protein source as defined herein does not comprise a chymotrypsin and/or a chymotrypsin-like endopeptidase.

Most preferably the at least one endopeptidase is a subtilisin containing protease preparation, preferably alcalase 2.4 L.

In a further aspect the at least one endopeptidase employed in the inventive process comprises or consists of thermolysin, aspartic protease, pepsin or glutamyl endopeptidase, acidic endopeptidases, aspartic protease and similar microbial endopeptidases or combinations thereof.

Furthermore, according to one preferred aspect, the at least one endopeptidase employed in the inventive process comprises or consists of a plant based protease, preferably papain, bromelain or combinations thereof.

According to a particularly preferred aspect the endopeptidase as employed in step (ii) of the inventive process may be added in an amount of 0.5 to 5% by weight based on the protein source, preferably in 1 to 3% by weight or 2 to 4% by weight.

In some aspects, the concentration of the endopeptidase employed in step (ii) of the inventive process may be 0.05 to 5 mg per gram of the protein source, preferably 0.1 to 0.5 mg or 0.3 to 1 mg or 0.8 to 1.5 mg or 1.2 to 2 mg or 1.6 to 2.5 mg or 2.2 to 3 mg or 2.7 to 3.5 mg or 3.1 to 4 mg or 3.8 to 4.5 mg per gram of the protein source.

Other Components

Additionally, according to one other preferred aspect micronutrients may be added to the protein source, either in step (i) or in step (ii) of the inventive process. Such micronutrients may be selected from vitamins, minerals and trace elements which may be present either alone or in combination. Alternatively, the protein source as employed in the inventive process does not contain any micronutrients or micronutrients may not be added to the inventive process.

According to a particularly preferred aspect a mineral content may be added to the protein source, either in step (i) or in step (ii) of the inventive process of 1.5 to 5% by weight based on the protein source, preferably 1.5 to 2% by weight or 1.8 to 2.5% or 2.3 to 3% or 2.8 to 3.5% or 3.3 to 4% or 3.8 to 4.5% by weight based on the protein source, most preferably 1.6 to 2.2% by weight based on the protein source.

The amounts of specific vitamins and minerals to be employed in the inventive process may be determined by one of skill in the art. More preferably, such specific vitamins and minerals are as defined above for the inventive composition.

Further minerals that may be added to the protein source, either in step (i) or in step (ii) of the inventive process may be trace elements. Such trace elements may include, for example, chromium, cobalt, copper, chloride, fluorine, iodine, manganese, molybdenum, selenium, and zinc.

Accordingly, in some aspects, the inventive process can include any combination of vitamins, minerals and trace elements that is useful in providing appropriate nutrition to the patient. The vitamins, minerals and trace elements may be used in the form of a mixture or formulation.

According to a particularly preferred aspect in step (ii) of the inventive process, the finite length of time is preferably 2 to 20 minutes, e.g. 2 to 10 minutes, 5 to 15 minutes or 10 to 20 minutes, or more specifically 2 to 5 minutes, 5 to 10 minutes, 10 to 15 minutes or 15 to 20 minutes, to obtain hydrolyzed protein.

In some aspects in step (ii) of the inventive process heating is carried out at 40 to 90° C., preferably at 40 to 90° C., more preferably at 60 to 80° C., even more preferably 70 to 85° C., e.g. at 45 to 50° C. or 48 to 55° C. or 52 to 60° C. or 58 to 65° C. or 62 to 70° C. or 68 to 70° C. or 71 to 75° C. or 72 to 78° C. or 77 to 83° C. or 81 to 86° C.

In a further aspect the inventive process comprises a preheating step prior to step (ii) which may be performed on the protein source in the absence of the at least one endopeptidase. In one aspect of the inventive process a preheating step prior to step (ii) is performed on the aqueous solution of a protein source in the presence of at least one endopeptidase. In a preferred aspect said pre-heating step is carried out at temperatures outlined for the inventive heating step defined above, preferably at 40 to 90° C., more preferably at 60 to 80° C., even more preferably 70 to 85° C., e.g. at 40 to 90° C., preferably 45 to 50° C. or 48 to 55° C. or 52 to 60° C. or 58 to 65° C. or 62 to 70° C. or 68 to 70° C. or 71 to 75° C. or 72 to 78° C. or 77 to 83° C. or 81 to 86° C.

In a further preferred aspect of the inventive process, said preheating step is carried out over a period of 5 seconds to 5 minutes, preferably 5 to 10 seconds or 8 to 15 seconds or 11 to 20 seconds or 14 to 25 seconds or 17 to 30 seconds or 20 to 35 seconds or 23 to 40 seconds or 26 to 45 seconds or 29 to 50 seconds or 32 to 55 seconds or 35 seconds to 1 minute or 38 seconds to 1 minute 5 seconds or 1 minute to 2 minutes or 1 minute 30 seconds to 3 minutes or 2 minutes to 4 minutes.

According to a particularly preferred aspect of step (ii) of the inventive process heating and/or optional the preheating step is carried out at 60 to 80° C., preferably 70 to 85° C., preferably 60 to 70° C. or 68 to 70° C. or 71 to 75° C. or 72 to 78° C. or 77 to 80° C. Said temperatures are advantageous since the inventors surprisingly found that this provides a very efficient process avoiding the formation of microbial biofilms.

Although in some aspects the inventive process may be run at lower temperatures such as 40 to 60° C., the inventors found that this led to the formation of microbial biofilms during longer runs of the continuous process. This is believed to be due to the formation of for instance nitrate $NO_2$ from nitrate $NO_3$.

Furthermore, the inventors surprisingly found that when compared to heating at 40 to 60° C., when in some aspects the inventive process was conducted at 60 to 80° C., preferably 70 to 85° C., most preferably 74 to 78° C. lower amounts of endopeptidase could be employed, for instance 3 times less, and a similar degree of protein hydrolysis was obtained even when the heating times were reduced from 15 to 5 minutes. Furthermore, according to a particularly preferred aspect the compositions obtained following steps (i) to (iii) of the inventive process do not have any bitterness.

Step (iii) of the Inventive Process

According to one further preferred aspect in step (iii) of the inventive process preferably heat inactivation of the endopeptidase is carried out at above 70° C., preferably at 70 to 150° C., preferably at 75 to 80° C., or 78 to 85° C. or 82 to 90° C. or 86 to 93° C. or 90 to 98° C. or 95 to 105° C. or 96 to 105° C. or 102 to 110° C. or 106 to 115° C. or 109 to 120° C. or 118 to 124° C. or 121 to 130° C. or 126 to 134° C. or 132 to 140° C. or 136 to 144° C.

In some aspects of the inventive process the heat inactivation is for a time of 2 to 60 seconds, preferably 5 to 15 seconds or 10 to 20 seconds or 18 to 25 seconds or 22 to 30 seconds or 28 to 35 seconds or 32 to 40 seconds or 38 to 46 seconds or 42 to 50 seconds or 48 to 56 seconds.

In a further preferred aspect of the inventive process the heat inactivation step is carried out with a plate heat exchanger, extruder or by steam injection.

Accordingly, in some aspects of the inventive process step (iii) heat inactivation of the endopeptidase is carried out by UHT treatment, preferably at above 135° C., preferably at 136 to 160° C., preferably 140 to 148° C. or 145 to 152° C. or 148 to 155° C. for a time of 1 to 5 seconds.

According to a particularly preferred aspect of the inventive process step (iii) heat inactivation of the endopeptidase, a UHT treatment step is then carried out, preferably at above 135° C. for a time of 1 to 5 seconds.

In some aspects of the inventive process, steps (i) and (ii), preferably also step (iii) are carried out at a pH of 6 to 11, e.g. a pH of 6.0 to 8.0, or a pH of 7.0 to 9.0, or a pH 8.0 to 10.0, or a pH 9.0 to 11.0, preferably a pH from pH of 6.0 to 8.0.

According to a preferred aspect of the inventive process a base such as KOH is employed to adjust the pH, although other bases including NaOH, calcium hydroxide, magnesium oxide or less preferably ammonium hydroxide may also be employed to adjust the pH to between pH of 6 to 11.

According to a preferred aspect of the inventive process an acid such as citric acid or phosphoric acid is employed to adjust the pH. Other acids which may be employed in the inventive process for said means include acetic acid and hydrochloric acid, most preferably hydrochloric acid. Those skilled in the art will recognize other means suitable for adjusting the pH.

In a further aspect of the inventive process following steps (i) to (iii) a heat sterilized liquid composition is obtained as a product of the inventive process, the heat sterilized liquid composition preferably being defined as herein above, more preferably comprising a protein source in an amount of 5 to 20% by weight of the composition, said liquid composition having a low viscosity, preferably a viscosity of below 875 mPa s at 20° C./100 s$^{-1}$ or below 600 mPa s at 20° C./100 s$^{-1}$, or likewise of below 200 mPa s at 20° C./100 s$^{-1}$, typically with a lower range of at least 10 mPa s at 20° C./100 s$^{-1}$, wherein preferably said heat sterilized liquid composition is an enteral composition or parenteral composition. Most preferably for said viscosity of below 875 mPa s at 20° C./100 s$^{-1}$ or below 600 mPa s at 20° C./100 s$^{-1}$ the protein source is in an amount of from 15 to 20% by weight of the composition, preferably 16 to 18% by weight of the composition.

In a yet further aspect of the inventive process following steps (i) to (iii) a heat sterilized liquid composition is obtained as a product of the inventive process, the heat sterilized liquid composition preferably being defined as herein above, more preferably comprising a protein source in an amount of 5 to 20% by weight of the composition, said liquid composition having a low viscosity, preferably a viscosity of below 350 mPa s at 70° C./100 s$^{-1}$ or below 240 mPa s at 70° C./100 s$^{-1}$, or likewise of below 80 mPa s at 70° C./100 s$^{-1}$, wherein preferably said heat sterilized liquid composition is an enteral composition or parenteral composition. Most preferably for said viscosity of below 350 mPa s at 70° C./100 s$^{-1}$ or below 240 mPa s at 70° C./100 s$^{-1}$ the protein source is in an amount of from 5 to 12% by weight of the composition, preferably in an amount of 8 to 10% weight of the composition.

In a yet further aspect of the inventive process following steps (i) to (iii) a heat sterilized liquid composition is obtained as a product of the inventive process, the heat sterilized liquid composition preferably being defined as herein above, more preferably a heat sterilized high protein composition having low viscosity and being devoid of bitterness, comprising hydrolyzed heat sensitive protein source having a degree of protein hydrolysis in NPN/TN of 20 to 50% and at least one heat inactivated endopeptidase, wherein preferably said heat sterilized liquid composition is an enteral composition or parenteral composition.

The viscosity may be determined by methods known to a skilled person, e.g. by using a rotational viscosity meter using a cone/plate geometry as defined herein before for the inventive composition.

In some aspects of the inventive process casein, caseinates or casein containing ingredients may be added after step (ii) or step (iii) of the inventive process.

In some aspects of the inventive process following steps (i) to (iii) the heat sterilized composition is in an optional step (iv) dried to form a powder, preferably by spray drying, freeze drying, by lyophylisation or fluid bed agglomeration.

According to a particularly preferred aspect of the inventive process following steps (i) to (iii) the heat sterilized composition is in an optional step (v) cooled to 0 to 15° C., preferably 2 to 5° C. or 4 to 8° C. or 6 to 11° C. or 9 to 14° C., most preferably 4° C.

According to a preferred aspect the entire composition obtained following steps (i) to (iii) of the inventive process is shelf stable. In some aspects of the inventive process the shelf life is at least 9 months, preferably at least 1 year which preferably commences after either the final process step, more preferably final process step (iii).

Furthermore, in some aspects, the entire compositions obtained following steps (i) to (ii) of the inventive process are not substantially bitter in taste and the liquid compositions obtained have a relatively low viscosity, low osmolality which are not jellified and/or not flocculated.

In a further aspect the entire composition obtained following steps (i) to (iii) of the inventive process have improved stability, preferably an extended shelf life.

According to a further embodiment, uses of the inventive compositions as described herein, either as described initially or as obtained or obtainable according to the inventive process, are contemplated. According to one embodiment the inventive composition is particularly suitable for the use in providing nutrition to a person that is in a disease state or a person that is recovering from a disease state or a person that is malnourished.

As used herein, the term "a disease" refers to any derangement or abnormality of function; a morbid physical or mental state. See Dorland's Illustrated Medical Dictionary, (W.B. Saunders Co. 27th ed. 1988).

In some aspects treatment of such diseases or malnourishment is preferably accomplished by administering a therapeutically effective amount of an heat sterilized composition as defined according to the present invention to a subject in need thereof. According to a particularly preferred aspect such a heat sterilized composition is to be administered once daily, preferably twice daily, more preferably three times daily, wherein during administration preferably at least one unit or dose for administration is provided, as defined herein. Upon administration, preferably the total amount of energy to be administered per day is as defined before. As used herein, the term "subject" refers to an animal. Preferably, the animal is a mammal. A subject also refers to for example, primates (e.g., humans), cows, sheep, goats, horses, dogs, cats, rabbits, rats, mice, fish, birds and the like. In some aspects the subject is a human.

The term "therapeutically effective amount" of a heat sterilized composition of the present invention refers to an amount of the compound of the present invention that will elicit the biological or medical response of a subject, or ameliorate symptoms, slow or delay disease progression, or prevent a disease, etc. In a further aspect such a "therapeutically effective amount" is a packaged dose or unit as obtained.

According to one embodiment the inventive heat sterilized compositions as described herein, either as described initially or as obtained or obtainable according to the inventive process, are preferably suitable for use in infants (children under the age of 1). In some aspects the inventive compositions are also suitable for use by adults and children.

According to one aspect the heat sterilized composition obtainable from the inventive process is a nutritional composition, a nutritional supplement, an infant formula, follow-on formula, a baby food formula, an infant cereal formula or a growing-up milk, infant or child's food supplement, a children formula adult nutritional composition, maternal nutritional supplement, bariatric formula, elderly nutritional composition or health care formula. Most preferably the heat sterilized composition obtainable from the inventive process is an enteral compositions or parenteral composition.

In some aspects the heat sterilized composition obtainable from the inventive process is for use in providing nutrition to a person in need thereof, wherein the person is preferably an elderly person, an infant or a child, a person that is in a disease state, a person that is recovering from a disease state, a person that is malnourished, or a healthy person such as a sportsman or sportswoman or an active elderly.

Various embodiments of the invention have been described above. The descriptions are intended to be illustrative, not limitative. Thus, it will be apparent to one skilled in the art that certain modifications maybe made to the invention as described without departing from the scope of the claims set out below.

For example, as described herein, "preferred embodiment" means "preferred embodiment of the present invention". Likewise, as described herein, "various embodiments" and "another embodiment" means "various embodiments of the present invention" and "another embodiment of the present invention", respectively.

Unless otherwise indicated, the term "at least" in the context of the present invention typically preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or sometimes when used herein with the term "having". When used herein "consisting of" excludes any element, step, or ingredient not specified in the claim element. When used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

Furthermore, percentages as described in the present invention can be interchangeably either % weight-by-weight (w/w) or % weight-by-volume (w/v), if not specifically indicated otherwise.

Finally, all publications and patents cited in this disclosure are incorporated by reference in their entirety. To the extent the material incorporated by reference contradicts or is inconsistent with this specification, the specification will supersede any such material.

FIGURES

The following Figure is intended to illustrate the invention further. It is not intended to limit the subject matter of the invention thereto.

FIG. 1: Shows a schematic for the process as described herein. As one can see, the inventive process preferably employs a protein source, typically in form of a solution, wherein the endopeptidase is added to said protein source, preferably as a solution. The obtained mixture is then typically preheated to 40 to 90° C. and hydrolysis may then be carried out at 40 to 90° C. in for instance a holding tube for a finite length of time selected from a period of 2 to 20 minutes. Following hydrolysis, the enzyme is inactivated and then typically cooled to provide a heat sterilised composition comprising the thus obtained hydrolysate.

Figure 2:
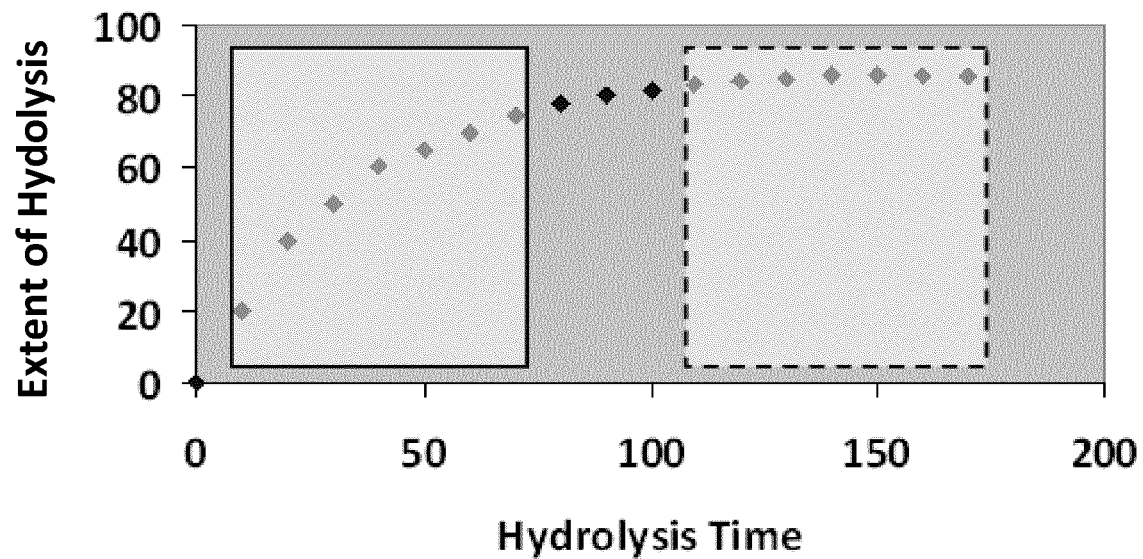

FIG. 2: Shows a schematic for a typical batch process for protein hydrolysis of the prior art. As one can see from the RHS rectangle (with broken line), there is little impact on the range of extent or degree of hydrolysis at the end of reaction as the protein is extensively hydrolysed.

This is in stark contrast to the LHS rectangle (with solid line), which shows a big impact in the range of the degree of hydrolysis for a partial hydrolysis, which ranges in a degree or extent of hydrolysis from about 20 to 75%.

Figure 3:
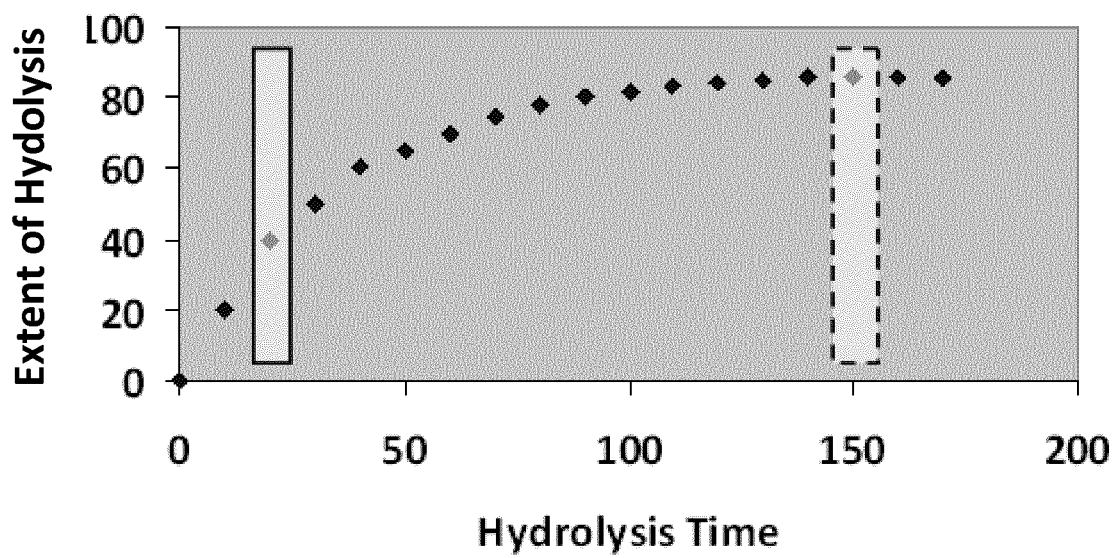

FIG. 3: Shows a schematic of the inventive process whereby the protein source is treated in a continuous process with at least one endopeptidase. The RHS rectangle (with broken line) is for comparative purposes and shows little impact if the hydrolysis is allowed to go to completion—i.e. when a finite length of time is not applied—providing an extensively hydrolysed protein not falling under the scope of the present invention.

In stark contrast, as shown by LHS rectangle (with solid line) when as per the inventive process a finite length of time is employed selected from a period of 2 to 20 minutes, there is little impact in the range of the extent or degree of hydrolysis for a partial hydrolysis of the protein source. In this illustration, the extent or degree of hydrolysis ranges from about 35 to 45%.

EXAMPLES

The following examples are intended to illustrate the invention further. They are not intended to limit the subject matter of the invention thereto.

Example 1: Exemplary Continuous Process for Preparing a Heat Sterilized Composition from Whey Protein Concentrate—Moderate Temperature A whey protein source containing

| Ingredient | % by weight |
|---|---|
| Water | 72 |
| Dry matter | 28 |
| Whey Protein concentrate[1] | 20 |

Notes:
[1] % NPN/TN = 11.1; % amino N/TN TNBS method 3.5 was adjusted to pH 7.4 at 60° C. with a potassium hydroxide solution, followed by 10 minutes hydration time to obtain an aqueous solution. To said aqueous solution was added an endopeptidase solution of alcalase 2.4 L in 3% by weight based on the whey protein source. Said mixture was then preheated to 55° C. using a plate heat exchanger for about 30 seconds, followed by hydrolysis in a holding tube for 15 minutes at 55° C. Enzyme inactivation was then directly carried out on this mixture by heating at 95° C. for 10 seconds. The obtained hydrolysate was then cooled to 4° C.

The obtained liquid composition was without any taste/bitterness and had a % NPN/TN of 40.4. Furthermore this had a viscosity of below 600 mPa s at 20° C./100 $s^{-1}$ determined using a rotational viscosity meter using a cone/plate geometry.

Example 2: Exemplary Continuous Process for Preparing a Heat Sterilized Composition from Whey Protein Concentrate—Moderate Temperature A whey protein source containing

| Ingredient | % by weight |
| --- | --- |
| Water | 72 |
| Dry matter | 28 |
| Whey Protein concentrate[1] | 8 |

Notes:
[1] % NPN/TN = 11.1; % amino N/TN TNBS method 3.5 was adjusted to pH 7.4 at 60° C. with a potassium hydroxide solution, followed by 10 minutes hydration time to obtain an aqueous solution. To said aqueous solution was added an endopeptidase solution of alcalase 2.4 L in 3% by weight based on the whey protein source. Said mixture was then preheated to 55° C. using a plate heat exchanger for about 30 seconds, followed by hydrolysis in a holding tube for 15 minutes at 55° C. Enzyme inactivation was then directly carried out on this mixture by heating at 95° C. for 10 seconds. The obtained hydrolysate was then cooled to 4° C.

The obtained liquid composition was without any taste/bitterness and had a % NPN/TN of 40.4. Furthermore this had a viscosity of below 800 mPa s at 20° C./100 $s^{-1}$ and below 320 mPa s at 70° C./100 $s^{-1}$ determined using a rotational viscosity meter using a cone/plate geometry.

Example 3: Exemplary Continuous Process for Preparing a Heat Sterilized Composition from Whey Protein Concentrate—High Temperature A whey protein source containing

| Ingredient | % by weight |
| --- | --- |
| Water | 72 |
| Dry matter | 28 |
| Whey Protein concentrate[1] | 8 |

Notes:
[1] % NPN/TN = 11.1; % amino N/TN TNBS method = 3.5 was adjusted to pH 7.4 at 60° C. with a potassium hydroxide solution, followed by 10 minutes hydration time to obtain an aqueous solution. To said aqueous solution was added an endopeptidase solution of alcalase 2.4 L in 1% by weight based on the whey protein source. Said mixture was then preheated to 78° C. using a plate heat exchanger for about 30 seconds, followed by hydrolysis in a holding tube for 5 minutes at 78° C. Enzyme inactivation was then directly carried out on this mixture by heating at 95° C. for 10 seconds. The obtained hydrolysate was then cooled to 4° C.

The obtained liquid composition was without any taste/bitterness and had a % NPN/TN of 38.6. Furthermore, this had a viscosity of below 205 mPa s at 20° C./100 $s^{-1}$ and below 80 mPa s at 70° C./100 $s^{-1}$ determined using a rotational viscosity meter using a cone/plate geometry.

Example 4: Exemplary Continuous Process for Preparing a Heat Sterilized Composition from Casein: Whey (30:70)—Moderate Temperature An aqueous protein source containing:

| Ingredient | % by weight |
| --- | --- |
| casein:whey (30:70)[1] | 8 |

Notes:
[1] % NPN/TN = 11.1; % amino N/TN TNBS method = 3.5 was adjusted to pH 7.4 at 60° C. with a potassium hydroxide solution, followed by 10 minutes hydration time to obtain an aqueous solution. To said aqueous solution was added an endopeptidase solution of alcalase 2.4 L in 3% by weight based on the protein source. Said mixture was then preheated to 55° C. using a plate heat exchanger for about 30 seconds, followed by hydrolysis in a holding tube for 5 minutes at 55° C. Enzyme inactivation was then directly carried out on this mixture by heating at 95° C. for 10 seconds. The obtained hydrolysate was then cooled to 4° C.

The obtained liquid composition was without any taste/bitterness and had a % NPN/TN of 39.0. Furthermore this had a viscosity of below 200 mPa s at 20° C./100 $s^{-1}$ determined using a rotational viscosity meter using a cone/plate geometry.

Example 5: Exemplary Continuous Process for Preparing a Heat Sterilized Composition from Soy Protein Isolate/Curd A soy protein source containing

| Ingredient | % by weight |
| --- | --- |
| Water | 87 to 90 |
| Dry matter of which: | 10-13 |
| Soy protein isolate/curd[1] | 60 |
| Fat | 33% |
| Ashes on TS | 3% |

Notes:
[1] % amino N/TN TNBS method = 3

Several trials 4a to 4d were then conducted following the protocol of example 1 and example 2 with the following modifications—the pH was adjusted to pH 6.8 to pH 8 at 60° C. with a potassium hydroxide solution to obtain an aqueous solution, the pre-heating step was at 68-70° C. for about 30 seconds and hydrolysis was conducted at 68-70° C. for 15 to 20 minutes along with the following further modifications:

| Ref | Endopeptidase solution | Enzyme inactivation |
| --- | --- | --- |
| 4a | Alcalase 2.4 L 0.05% on solids | 120° C. for 5 seconds |
| 4b | 0.1% Alcalase 2.4 L based on protein | 120° C. for 5 seconds |

-continued

| Ref | Endopeptidase solution | Enzyme inactivation |
|---|---|---|
| 4c | Alcalase 2.4 L 0.2% on solids | 140° C. for 40 seconds |
| 4d | 0.33% Alcalase 2.4 L based on protein | 140° C. for 40 seconds |

In all of trials 4a to 4d a liquid composition was provided having a viscosity of below 200 mPa s at 20° C./100 s$^{-1}$ determined using a rotational viscosity meter using a cone/plate geometry.

Furthermore, for all of 4a to 4d the liquid composition was without any bitter taste having an % amino N/TN TNBS method of around 6%.

Example 6: Comparison of Typical Batch Process with the Inventive Process Conducted at 55° C.

To compare a typical batch hydrolysis process with the inventive continuous process the following trials were conducted. In all cases the input protein source had a % NPN/TN=11.1; % amino N/TN TNBS method=3.5.

Trial 5a—The whey protein source of example 2 was subjected to a batch hydrolysis process at 55° C. for 2 hours at pH 7.4, by pH adjustment with potassium hydroxide solution.

Trial 5b was subjected to the inventive continuous hydrolysis process at 55° C. under the conditions as described for example 2

Trial 5c was subjected to the inventive continuous hydrolysis process at 55° C. under the conditions as described for example 4.

| Ref | Time | Protein Source (8%) | % NPN/TN | Taste |
|---|---|---|---|---|
| 5a | 2 hours (batch) | Whey protein concentrate) | 57 | Very bitter |
| 5b | 15 minutes (continuous) | Whey protein concentrate | 40.4 | Not bitter |
| 5c | 5 minutes (continuous) | Whey protein concentrate 30:70 casein:whey | 39 | Not bitter |

As one can see, a typical batch hydrolysis process (5a) provided a product which was very bitter in taste. In contrast, the inventive continuous hydrolysis process as outlined in trials 5b and 5c provided products which were not bitter in taste.

The invention claimed is:

1. A process for preparing a heat sterilized liquid composition which comprises a protein source containing hydrolyzed protein, the process comprising the following steps:
   (i) providing an aqueous solution of a protein source;
   (ii) performing a continuous hydrolysis step wherein the aqueous solution of the protein source is treated with at least one endopeptidase by heating at 40 to 90° C. for a finite length of time selected from a period of 2 to 20 minutes; and
   (iii) heat inactivation of the at least one endopeptidase to obtain the heat sterilized liquid composition, the protein source being 5 to 20% by weight of the heat sterilized liquid composition, the heat sterilized liquid composition having a viscosity below 875 mPa s at 20° C./100 s$^{-1}$, and the protein source comprising hydrolyzed protein having a degree of protein hydrolysis in Non-protein nitrogen/Total nitrogen (NPN/TN) of 20 to 50%.

2. The process according to claim 1, wherein steps (i) and (ii) are performed at a pH of 6 to 11.

3. The process according to claim 1, wherein step (iii) heat inactivation of the at least one endopeptidase is performed at above 70° C.

4. The process according to claim 1, wherein following steps (i) to (iii) the heat sterilized liquid composition is obtained comprising the protein source in an amount of 5 to 20% by weight of the heat sterilized liquid composition, the heat sterilized liquid composition having a viscosity below 200 mPa s at 20° C./100 s$^{-1}$.

5. The process according to claim 1, wherein following steps (i) to (iii) the heat sterilized liquid composition is dried to form a powder.

6. The process according to claim 5, wherein the heat sterilized liquid composition is dried to form the powder by spray drying.

* * * * *